(12) United States Patent
Gasparini et al.

(10) Patent No.: US 9,385,626 B2
(45) Date of Patent: Jul. 5, 2016

(54) SYSTEM AND METHOD FOR EFFICIENTLY HARVESTING ENVIRONMENTAL ENERGY

(75) Inventors: Alessandro Gasparini, Cusano Milanino (IT); Stefano Ramorini, Arluno (IT); Giorgio Massimiliano Membretti, Milan (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 929 days.

(21) Appl. No.: 13/456,814

(22) Filed: Apr. 26, 2012

(65) Prior Publication Data

US 2012/0274144 A1    Nov. 1, 2012

(30) Foreign Application Priority Data

Apr. 29, 2011    (IT) ................ TO2011A0379

(51) Int. Cl.
*H02M 7/217*    (2006.01)
*B60C 23/04*    (2006.01)

(52) U.S. Cl.
CPC ........... *H02M 7/2176* (2013.01); *B60C 23/041* (2013.01); *B60C 23/0411* (2013.01); *Y10T 307/696* (2015.04)

(58) Field of Classification Search
CPC ............... H02J 1/00; H02J 7/025; H03G 9/00
USPC ...................... 307/80, 81; 290/1 R
See application file for complete search history.

(56) References Cited

U.S. PATENT DOCUMENTS

| | | | |
|---|---|---|---|
| 4,750,099 A * | 6/1988 | Inoue | .............. H02J 7/35 136/293 |
| 5,617,015 A | 4/1997 | Goder et al. | |
| 5,923,154 A | 7/1999 | Moller | |
| 6,229,292 B1 | 5/2001 | Redl et al. | |
| 6,504,208 B2 | 1/2003 | Bosco et al. | |
| 6,995,496 B1 | 2/2006 | Hagood, IV et al. | |
| 7,105,982 B1 | 9/2006 | Hagood, IV et al. | |
| 7,132,765 B2 | 11/2006 | Premont et al. | |
| 7,193,401 B1 | 3/2007 | Hasegawa | |
| 7,466,112 B2 | 12/2008 | Zhou et al. | |
| 7,773,399 B2 | 8/2010 | Nakamura et al. | |

(Continued)

FOREIGN PATENT DOCUMENTS

WO    WO-2007040536 A2    4/2007

OTHER PUBLICATIONS

Maxim Integrated Products: MAXIM Dual Mode 5V/Programmable Micropower Voltage Regulators (MAX663/MAX664/MAX666) Spec Sheet; Rev 1; Jul. 1996; pp. 1-8.*

(Continued)

*Primary Examiner* — Kenneth B Wells
*Assistant Examiner* — James P Evans
(74) *Attorney, Agent, or Firm* — Gardere Wynne Sewell LLP

(57) ABSTRACT

A transducer converts energy coming from an energy source into an electrical signal for storage as electrical energy on a first storage element. A switch is selectively actuated to pass electrical energy from the first storage element to a second storage element. The selective actuation of the switch is driven by sensing electrical energy stored in the second storage element. The switch is closed when electrical energy in the second storage element is sensed to fall below a first threshold. The switch is opened when electrical energy in the second storage element is sensed to rise above a second threshold.

8 Claims, 7 Drawing Sheets

(56) References Cited

U.S. PATENT DOCUMENTS

| | | | |
|---|---|---|---|
| 7,800,928 | B1 | 9/2010 | Dernovsek et al. |
| 7,915,871 | B2 | 3/2011 | Wang et al. |
| RE43,291 | E | 4/2012 | Groom |
| 8,159,204 | B2 | 4/2012 | Grant |
| 2002/0158513 | A1* | 10/2002 | Amano .............. F02N 11/0866 307/10.6 |
| 2004/0189267 | A1* | 9/2004 | Wecht .................. H02J 9/061 323/273 |
| 2005/0007178 | A1 | 1/2005 | Fahim |
| 2005/0110277 | A1 | 5/2005 | Adamson et al. |
| 2005/0218877 | A1 | 10/2005 | Oswald et al. |
| 2006/0237968 | A1 | 10/2006 | Chandrasekaran |
| 2007/0159150 | A1 | 7/2007 | Hosokawa et al. |
| 2008/0129144 | A1 | 6/2008 | Bechhoefer |
| 2008/0290846 | A1 | 11/2008 | Kanouda et al. |
| 2009/0284886 | A1 | 11/2009 | Matsumoto |
| 2009/0309566 | A1 | 12/2009 | Shiu |
| 2009/0322303 | A1 | 12/2009 | Hirata et al. |
| 2010/0084920 | A1 | 4/2010 | Banting et al. |
| 2010/0165686 | A1 | 7/2010 | Matzberger et al. |
| 2010/0301122 | A1 | 12/2010 | Russell et al. |
| 2011/0096578 | A1 | 4/2011 | Fang et al. |
| 2011/0221416 | A1 | 9/2011 | Ivanov et al. |
| 2011/0285131 | A1 | 11/2011 | Kwon et al. |
| 2012/0169064 | A1 | 7/2012 | Hoffman et al. |
| 2012/0224398 | A1 | 9/2012 | Franco et al. |
| 2012/0235976 | A1 | 9/2012 | Van Lier |
| 2014/0232189 | A1 | 8/2014 | Gasparini et al. |

OTHER PUBLICATIONS

Lee S. et al: "Robust and Efficient Synchronous Buck Converter With Near-Optimal Dead-Time Control," IEEE International Solid-State Circuits Conference, Feb. 2011.

Dwari, Suman et al: "An Efficient AC-DC Step-Up Converter for Low-Voltage Energy Harvesting," IEEE Transactions on Power Electronics, vol. 25, No. 8, Aug. 2010, pp. 2188-2199.

EPO Search Report for EP12162786.3 mailed Sep. 4, 2012 (7 pages).

Belloni M et al: "On the Design of Single-Inductor Multiple-Output DC-DC Buck Converters," Circuits and Systems, 2008, ISCAS 2008, IEEE International Symposium on, IEEE, Piscataway, NJ, US, May 18, 2008, pp. 3049-3052.

IT Search Report and Written Opinion for IT TO2011A000379 mailed Feb. 16, 2012 (7 pages).

Ma D et al: "A Pseudo-CCM/DCM Simo Switching Converter With Freewheel Switching," IEEE Journal of Solid-State Circuits, IEEE Service Center, Piscataway, NJ, US, vol. 38, No. 6, Jun. 1, 2003, pp. 1007-1014.

Seeman M D et al: "An Ultra-Low-Power Power Management IC for Energy-Scavenged Wireless Sensor Nodes," Power Electronics Specialists Conference, 2008, PESC 2008, IEEE, Piscataway, NJ, US, Jun. 15, 2008, pp. 925-931.

Seeman M D et al: "An Ultra-Low-Power Power Management IC for Wireless Sensor Nodes," Custom Integrated Circuits Conference, 2007, CICC '07, IEEE, Piscataway, NJ, US, Sep. 16, 2007, pp. 567-570.

Shenck N S et al: "Energy Scavenging with Shoe-Mounted Piezoelectrics," IEEE Micro, IEEE Service Center, Los Alamitos, CA, US, vol. 21, No. 3, May 1, 2001, pp. 30-42.

Wing-Hung Ki et al: "Single-Inductor Multiple-Output Switching Converters," 32nd Annual IEEE Power Electronics Specialists Conference, PESC 2001. Conference Proceedings, Vancouver, CA, Jun. 17-21, 2001, pp. 226-231.

Cao Xinping et al: "Electromagnetic Energy Harvesting Circuit With Feedforward and Feedback DC-DC PWM Boost Converter for Vibration Power Generator System," IEEE Transactions on Power Electronics, vol. 22, No. 2, Mar. 2007 (pp. 679-685).

Hasan, A., et al.: "Monolithic DC-DC Boost Converter With Current-Mode Hysteretic Control," Electrical and Computer Engineering (CCECE), 2011 24th Canadian Conerence on, IEEE, May 8, 2011, pp. 1242-1245.

Salmon, J. C. ED—Institute of Electrical and Electronics Engineers: "Circuit Topologies for Single-Phase Voltage-Doubler Boost Rectifiers," IEEE, US, Feb. 23, 1992, pp. 549-556.

\* cited by examiner

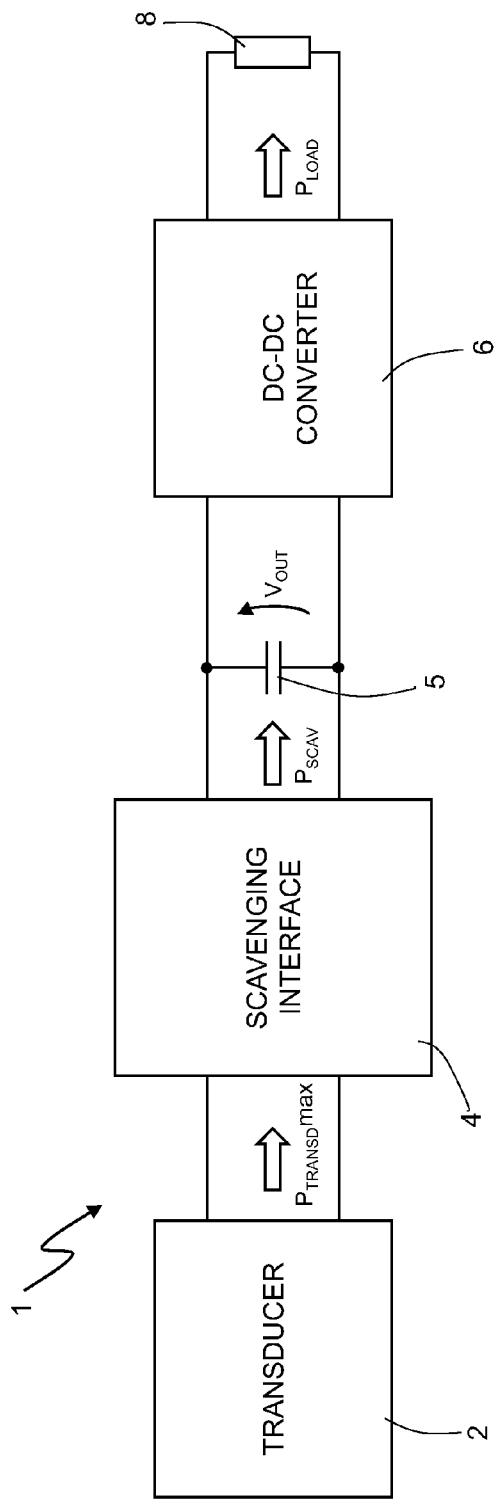
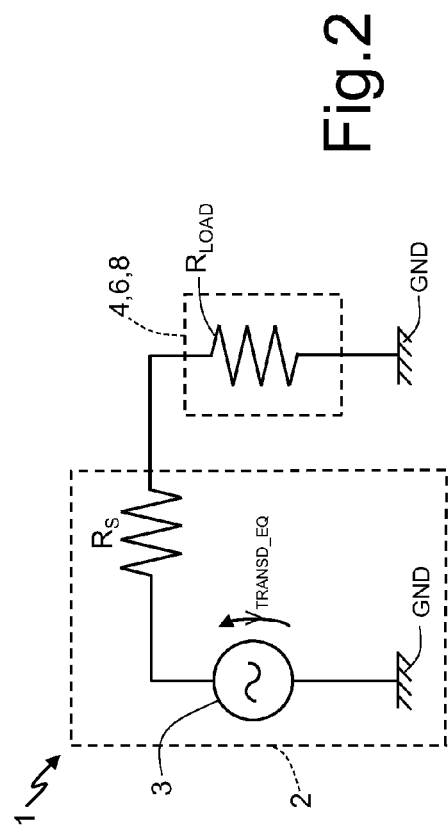

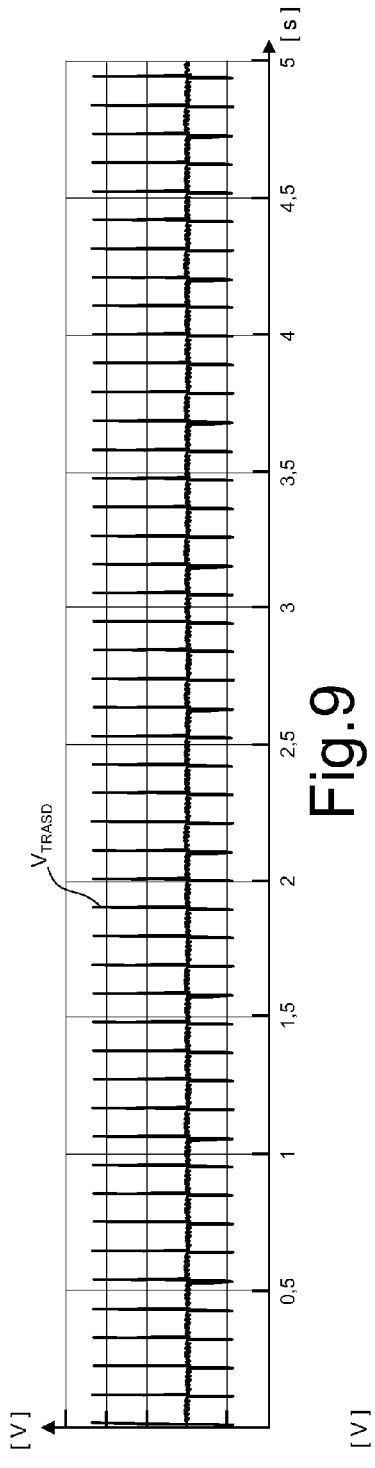
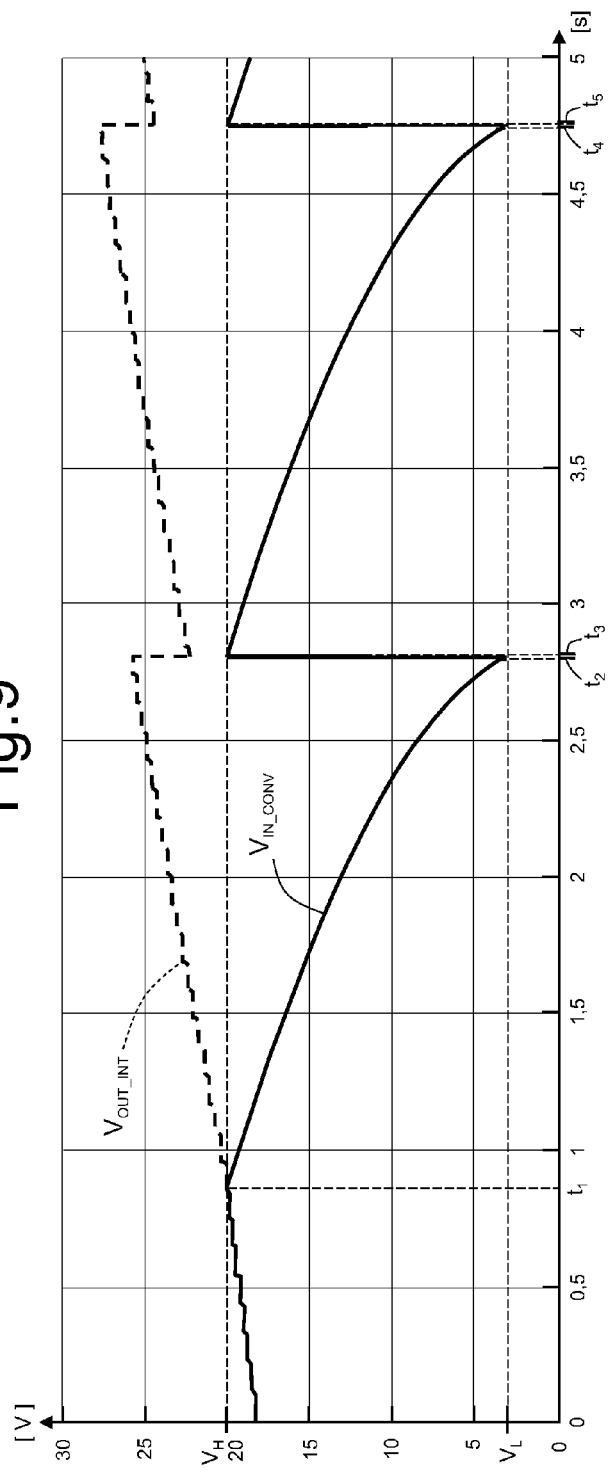
Fig.9
Fig.10

SYSTEM AND METHOD FOR EFFICIENTLY HARVESTING ENVIRONMENTAL ENERGY

PRIORITY CLAIM

This application claims priority from Italian Application for Patent No. TO2011A000379 filed Apr. 29, 2011, the disclosure of which is hereby incorporated by reference.

TECHNICAL FIELD

The present invention relates to a system and to a method for efficiently harvesting environmental energy.

BACKGROUND

As is known, systems for harvesting energy (also known as "energy harvesting" or "energy scavenging" systems) from intermittent environmental energy sources, have aroused and continue to arouse considerable interest in a wide range of technological fields. Typically, energy harvesting systems are designed to harvest, store, and transfer energy generated by mechanical sources to a generic load of an electrical type.

One of the main energy sources that can be used for harvesting mechanical energy and converting it into electrical energy is constituted by piezoelectric or electromagnetic devices. Low-frequency vibrations, such as for example mechanical vibrations of disturbance in systems with moving parts, can be a valid energy source.

The main needs that are felt in the field of systems for harvesting energy from environmental sources include minimum consumption of energy of the components of the systems themselves, maximum efficiency for harvesting, conversion, and storage of energy, and the need to supply the energy stored to a plurality of devices different from one another that use it for their operation.

FIG. 1 is a schematic illustration, by means of functional blocks, of an energy harvesting system of a known type.

The energy harvesting system 1 of FIG. 1 comprises: a transducer 2, for example of an electromagnetic or piezoelectric type, subjected in use to environmental mechanical vibrations and configured for converting mechanical energy into electrical energy; a scavenging interface 4, for example comprising a rectifier circuit, configured for receiving at input an AC signal generated by the transducer 2 and supplying at output a DC signal for charging a capacitor 5 connected to the output of the scavenging interface 4; and a DC-DC converter 6, connected to the capacitor 5 for receiving at input the electrical energy stored by the capacitor 5 and supplying it to an electrical load 8.

The global efficiency $\eta_{TOT}$ of the energy harvesting system 1 is given by Eq. (1) below:

$$\eta_{TOT} = \eta_{TRANSD} \cdot \eta_{SCAV} \cdot \eta_{DCDC} \quad (1)$$

where: $\eta_{TRANSD}$ is the efficiency of the transducer 2, indicating the amount of energy available in the environment that has been effectively converted, by the transducer 2, into electrical energy; $\eta_{SCAV}$ is the efficiency of the scavenging interface 4, indicating the energy consumed by the scavenging interface 4 and the factor of impedance decoupling between the transducer and the interface; and $\eta_{DCDC}$ is the efficiency of the DC-DC converter 6.

As is known, in order to supply to the load the maximum power available, the impedance of the load should be equal to that of the source. As illustrated in FIG. 2, the transducer 2 can be represented schematically, in this context, as a voltage generator 3 provided with an internal resistance $R_S$ of its own.

The maximum power $P_{TRANSD}^{MAX}$ that the transducer 2 can supply at output may be defined as:

$$P_{TRANSD}^{MAX} = V_{TRANSD\_EQ}^2 / 4R_S; \text{ if } R_{LOAD} = R_S \quad (2)$$

Where: $V_{TRANSD\_EQ}$ is the voltage produced by the equivalent voltage generator; and $R_{LOAD}$ is the equivalent electrical resistance on the output of the transducer 2 (or, likewise, seen at input to the scavenging interface 4), which takes into due consideration the equivalent resistance of the scavenging interface 4, of the DC-DC converter 6, and of the load 8.

On account of the impedance decoupling ($R_{LOAD} \neq R_S$), the power at input to the scavenging interface 4 is lower than the maximum power available $P_{TRANSD}^{MAX}$.

The power $P_{SCAV}$ stored by the capacitor 5 is a fraction of the power recovered by the interface, and is given by Eq. (3):

$$P_{SCAV} = \eta_{TRANSD} \cdot \eta_{SCAV} \cdot P_{TRANSD}^{MAX} \quad (3)$$

whilst the power $P_{EL\_LOAD}$ supplied at output by the DC-DC converter to the electrical load 8 is given by the following Eq. (4):

$$P_{EL\_LOAD} = P_{DCDC} \cdot \eta_{DCDC} \quad (4)$$

where $P_{DCDC}$ is the power received at input by the DC-DC converter 8, in this case coinciding with $P_{SCAV}$.

The main disadvantage of the configuration according to FIG. 1 regards the fact that the maximum voltage supplied at output by the scavenging interface 4 is limited by the input dynamics of the DC-DC converter 8.

The voltage $V_{OUT}$ across the capacitor 5 (supplied at output by the scavenging interface 4 and at input to the DC-DC converter 8) is in fact determined on the basis of the power balancing according to the following Eq. (5):

$$P_{STORE} = P_{SCAV} - P_{DCDC} \quad (5)$$

where $P_{STORE}$ is the excess power with respect to the power required by the load, recovered by the interface and stored in the capacitor.

In applications where the transducer 2 converts mechanical energy into electrical energy in a discontinuous way (i.e., the power $P_{TRANSD}^{MAX}$ varies significantly in time) and/or the power $P_{EL\_LOAD}$ required by the electrical load 8 varies significantly in time, also the voltage $V_{OUT}$ consequently presents a plot that is variable in time.

This causes, for example, a variation of the efficiency factor $\eta_{DCDC}$, which assumes low values at high values of $V_{OUT}$. The maximum value of $V_{OUT}$ is moreover limited by the range of input voltages allowed by the DC-DC converter. Maximization of the window of values allowed at input by the DC-DC converter 6 requires a specific design of the DC-DC converter; however, also in the latter case, an upper limit of the range of allowable values for $V_{OUT}$ is imposed.

There is a need in the art to provide system and a method for efficiently harvesting environmental energy that will enable the aforesaid problems and disadvantages to be overcome.

SUMMARY

In accordance with an embodiment, a system and method enable maximization of the storage of electrical charge without requiring constraints of design of other components of the system itself, maximizing the global efficiency.

According to the present invention a system and a method for efficiently harvesting environmental energy are provided as defined in the annexed claims.

BRIEF DESCRIPTION OF THE DRAWINGS

For a better understanding of the present invention, preferred embodiments thereof are now described, purely by way of non-limiting example and with reference to the attached plates of drawings, wherein:

FIG. 1 shows an energy harvesting system according to a known embodiment;

FIG. 2 shows an equivalent circuit representation of the system of FIG. 1;

FIGS. 9 and 10 show the time plots of electrical signals internal to the system of FIG. 3.

DETAILED DESCRIPTION OF THE DRAWINGS

Figure 3:
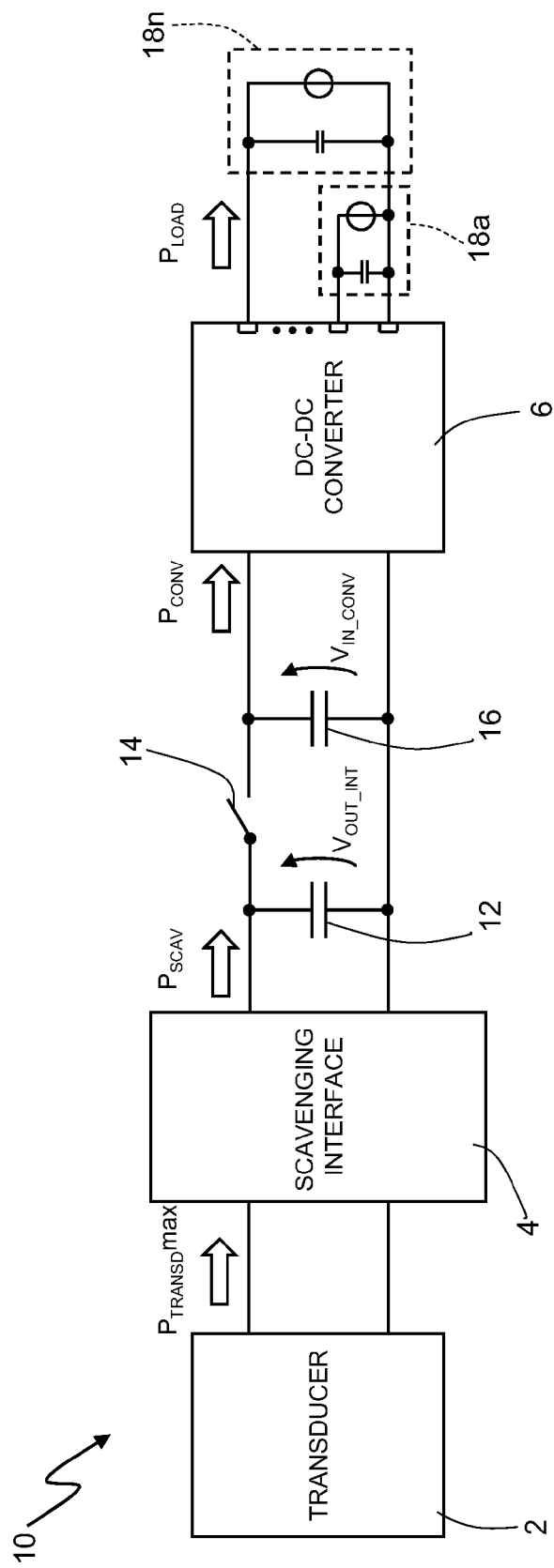
FIG. 3 shows an energy harvesting system according to one embodiment of the present invention.

FIG. 3 shows an energy harvesting system 10 according to one embodiment.

In a way similar to what is illustrated in FIG. 1 and described with reference to said figure, the energy harvesting system 10 comprises the transducer 2 and the scavenging interface 4, electrically coupled to one another in a way in itself known.

The energy harvesting system 10 further comprises: a first storage element 12, for example one or more capacitors; a second storage element 16, for example one or more capacitors; a switch 14, connected between the first storage element 12 and the second storage element 16, which can be operated for connecting the first and second storage elements 12, 16 to one another; and the DC-DC converter 6, electrically coupled to the second storage element 16 and configured for supplying one or more loads 18a ... 18n connected to respective outputs 6a ... 6n of the DC-DC converter 6.

Figure 4:
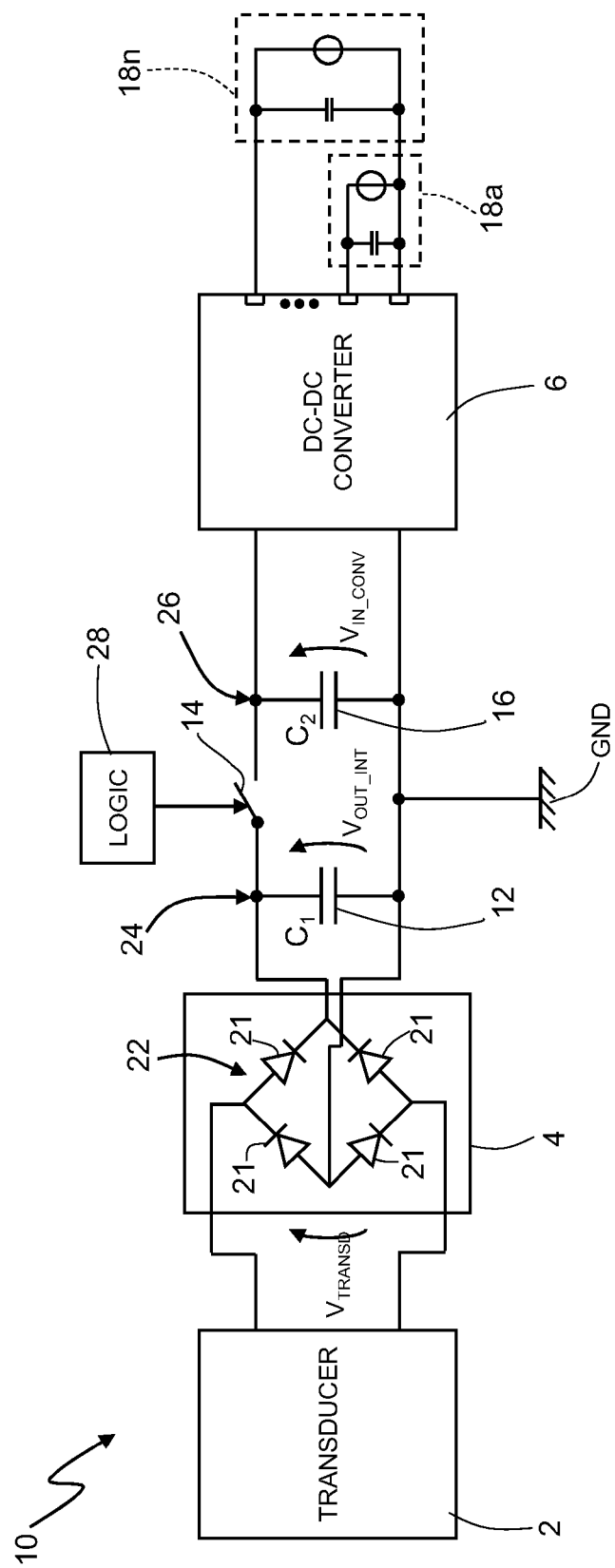
FIG. 4 shows at a greater circuit detail the system of FIG. 3.

In greater detail, as illustrated in FIG. 4, the scavenging interface 4 comprises, according to one embodiment, a rectifier 20, for example comprising diodes 21 connected to one another to form a Graetz-bridge structure 22. The rectifier 20 has the function of receiving at input an AC signal (for example, a voltage signal) generated by the transducer 2 and supplying at output a corresponding DC signal (once again, a voltage signal). It is evident that the rectifier 20 is not necessary in the case where the transducer 2 is configured for generating at output a DC signal (in particular, a voltage signal) $V_{TRANSD}$.

The input terminals of the bridge structure 22 are connected to respective output terminals of the transducer 2 so as to be biased at the input voltage $V_{TRANSD}$ generated at output by the transducer 2. The output terminals of the bridge structure 22 are, instead, connected between a ground reference terminal GND, at reference voltage $V_{REF}$, and a biasing terminal 24, at voltage $V_{OUT\_INT}$. The first storage element 12 is connected between the biasing terminal 24 and the ground reference terminal GND, and, in use, is charged to a voltage $V_{OUT\_INT}-V_{REF}$. For example, the voltage $V_{REF}$ is 0 V. The voltage $V_{REF}$ can, however, assume values other than 0 V, for example be in a neighborhood of 0 V, or assume other values still, higher or lower than of 0 V, indifferently.

The switch 14 is connected between the biasing terminal 24 and an intermediate terminal 26. The second storage element 16 is connected between the ground reference terminal GND and the intermediate terminal 26. In this way, in use, the switch 14 can be operated for coupling the second storage element 16 with the biasing terminal 24, providing ideally a connection in parallel between the first and second storage elements 12, 16 and, alternately, uncoupling the second storage element 16 from the biasing terminal 24 insulating electrically the first storage element 12 from the second storage element 16. The switch 14 is controlled in opening and closing by an appropriate control logic 28, which will be described more fully in what follows.

In use, the voltage $V_{OUT\_INT}$ generated at output by the scavenging interface 4 is stored in the first storage element 12. In the case where the switch 14 is open, there is no transfer of charge from the first storage element 12 to the second storage element 16 and the DC-DC converter 6. The switch 14 can be driven in closing for the time necessary to charge the second storage element 16, by transfer of charge from the first storage element 12. Once a desired state of charge of the second storage element 16 has been reached, the switch 14 is opened, insulating the first storage element 12 from the second storage element 16.

The first storage element 12 is configured for storing a high electrical charge. In particular, the storage element 12 is an element of a capacitive type having a capacitance $C_1$ of between 10 μF and 100 μF, for example equal to 50 μF. The second storage element 16 is also of a capacitive type, having a capacitance $C_2$ of between 1 μF and 20 μF, for example equal to 10 μF. The second storage element 16 is moreover configured in such a way that the voltage that is set up between its conduction terminals does not exceed the range of voltages allowed at input by the DC-DC converter 6 used. In this way, it is possible to use DC-DC converters 6 of a known type, designed without particular constraints of input dynamics deriving from the specific technical application.

If $V_L$ is the lower limit of the range of voltages allowed at input by the DC-DC converter, and $V_H$ is the upper limit of the range of voltages allowed at input by the DC-DC converter, the condition that brings about opening of the switch 14 is given by $V_{IN\_CONV} > V_H$, whereas the condition that brings about closing of the switch 14 is given by $V_{IN\_CONV} < V_L$. Hence, in use, we find that $V_L < V_{IN\_CONV} < V_H$. Said condition is ensured, in use, by the logic 28, which implements, for example, a hysteretic algorithm such as to satisfy the aforesaid condition for the voltage $V_{IN\_CONV}$.

Figure 5:
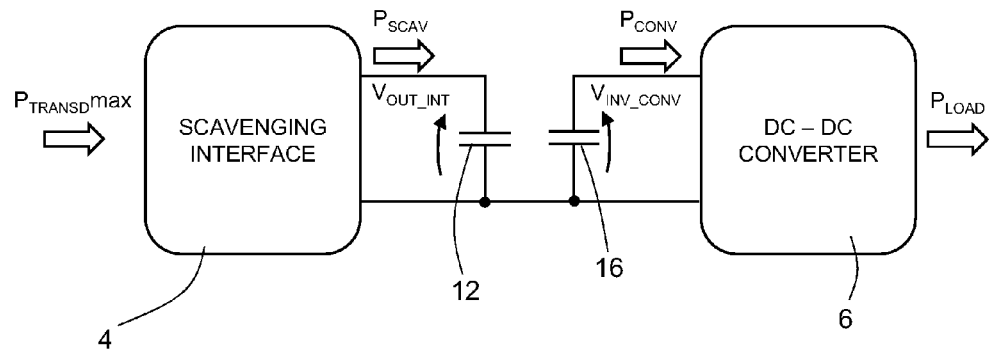
FIG. 5 shows the system of FIG. 3 during a first operating step.

FIG. 5 shows a portion of the energy harvesting system 10 during an operating step in which the switch 14 is open, in particular during a step of charging of the first storage element 12 via the energy supplied by the transducer 2 and of simultaneous supply of the DC-DC converter 6 by means of the second storage element 16. The DC-DC converter 6 is supplied at input by the charge stored in the second storage element 16, which consequently, during the step according to FIG. 5, decreases. The first storage element 12 is electrically uncoupled from the load 18a ... 18n and receives at input the voltage $V_{TRANSD}$ appropriately rectified by the scavenging interface 4 (and reduced by a factor depending upon the efficiency $\eta_{TRANSD}$ of the scavenging interface 4). The first storage element 12 is hence charged.

With reference to what has been described in regard to FIG. 5, it is evident that the supply of the DC-DC converter 6 is possible only if the second storage element 16 has been previously pre-charged. In an initial step of start-up of the energy harvesting system 10, the operating step of FIG. 5 comprises the step of charging both the first and the second storage elements 12, 16, in a way similar to what is described in what follows with reference to FIG. 6.

Figure 6:
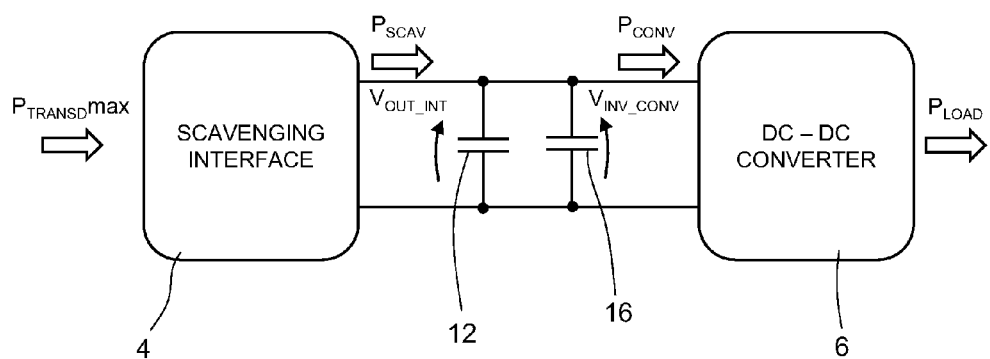
FIG. 6 shows the system of FIG. 3 during a second operating step.

FIG. 6 shows a portion of the energy harvesting system 10 during an operating step in which the switch 14 is closed. Said operating condition is achieved when the voltage $V_{IN\_CONV}$ across the second storage element 16 drops below the limit value $V_L$ and in the start-up step when both the first and the second storage elements 12, 16 are discharged. In this case, the logic 28 controls the switch 14 in closing. The first and second storage elements 12, 16 are hence electrically coupled to one another via the connection provided by the switch 14 closed (ideally, considering a switch 14 with zero internal resistance, they are connected in parallel to one another), and there is a transfer of charge between the first and second storage elements 12, 16. In particular, the second storage element is charged by means of the charge stored in the first storage element 12. Consequently, in the absence of supply by the transducer 2 (via the scavenging interface 4), the voltage $V_{OUT\_INT}$ drops and the voltage $V_{IN\_CONV}$ increases up to the value $V_H$ (provided that, of course, the voltage $V_{OUT\_INT}$ is sufficiently high as to enable the voltage $V_{IN\_CONV}$ to reach the value $V_H$). When the value $V_{IN\_CONV} = V_H$ is reached, the logic 28 controls the switch 14 in opening, and flow returns to the condition of FIG. 5.

Figure 7:
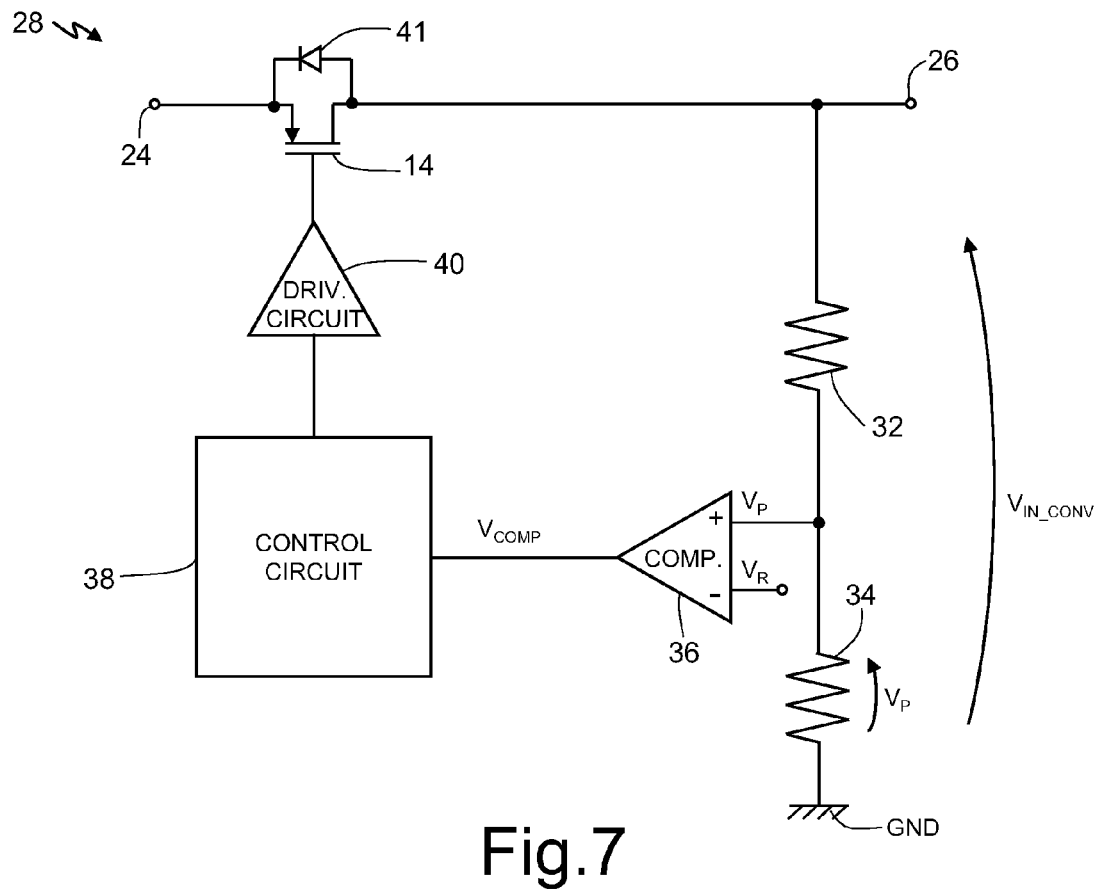
FIG. 7 is a schematic illustration of control logic for the system of FIG. 3.

FIG. 7 is a schematic illustration of the control logic 28, configured for controlling the switch 14 in opening and closing, according to one embodiment of the present invention.

The control logic 28 comprises: a first resistor 32 and a second resistor 34, connected between the intermediate terminal 26 and the ground reference terminal GND; a comparator 36, including a first input terminal configured for receiving a reference signal $V_R$ at input, a second input terminal connected between the first and second resistors 32, 34 for receiving a partition signal $V_P$ proportional to the signal $V_{IN\_CONV}$, and an output terminal for supplying at output a comparison signal $V_{COMP}$ indicating a result of the comparison between the reference signal $V_R$ and the partition signal $V_P$; a control circuit 38; and a driving circuit 40, connected to the control circuit 38.

The comparator 36 is a hysteretic comparator, of a known type. The comparator hence receives at input the signal to be monitored (partition signal $V_P$) and the reference signal $V_R$, around which it generates, in a known way, the hysteresis. The triggering thresholds are hence $V_H' = V_R + V_{HYST}/2$ and $V_L' = V_R - V_{HYST}/2$ (see also FIG. 8). Alternatively, the comparator 36 can be without hysteresis. In this case, the comparison signal $V_{COMP}$ varies when the partition signal $V_P$ rises/drops with respect to the threshold value given by the reference signal $V_R$. A hysteretic comparator is advantageous as compared to a non-hysteretic comparator in so far as it is less subject to undesirable variations of the output signal (comparison signal $V_{COMP}$) due to electrical noise.

The control circuit 38 is configured for receiving at input the comparison signal $V_{COMP}$ and, on the basis of the value assumed by the comparison signal $V_{COMP}$, controlling, via the driving circuit 40, the switch 14 in opening and closing. The control circuit 38 is, for example, a microprocessor circuit configured for carrying out the aforementioned step of checking on the comparison signal $V_{COMP}$. Furthermore, the control circuit 38 and the driving circuit 40 can be built in integrated form as a single control and driving circuit.

The switch 14 is, for example, a MOSFET of a P type, having a first conduction terminal (source terminal), connected to the biasing terminal 24, a second conduction terminal (drain terminal), connected to the intermediate terminal 26, and a control terminal (gate terminal). In this case, the switch 14 is of a type designed to sustain high voltages between its source and drain terminals (e.g., drift MOS, DMOS, etc.). The diode 41 must be connected as illustrated in FIG. 7 in order to prevent conduction when the switch 14 is open.

In detail, the diode 41 is connected between the source terminal S and the drain terminal D of the switch 14, in antiparallel configuration (with respect to the normal direction of flow of the current through the switch 14). As is known, a characteristic of a MOSFET is that of displaying, under certain operating conditions, the electrical properties of a diode (parasitic diode). Said diode is electrically set (integrated) between the source and drain terminals of the MOSFET. In other words, the switch 14 can present the electrical behavior of a diode, in which the cathode of the diode corresponds to the source terminal and the anode to the drain terminal. The diode 41 is hence the diode integrated in the MOSFET that forms the switch 14.

If technologies different from MOSFET technology are used for the switch 14, the diode 41 may not be present.

The driving circuit 40 is connected to the gate terminal of the switch 14 and is configured for biasing appropriately the gate terminal of the switch 14 in order to drive the transistor in conduction or inhibition. Said circuit is in effect a level shifter capable of converting the signal (typically at low voltage) produced by the control logic 38 into a CMOS signal referenced to the terminal 24 (source of the switch 14). By so doing it is possible to generate a correct driving signal of the switch 14 without jeopardizing operation thereof and without damaging the gate oxide thereof.

The value of resistance of the resistors 32 and 34 is chosen as high as possible according to the area on silicon available so as to guarantee the lowest current absorption at the node 26, and so as to maximize the overall efficiency of the system 10. The ratio between the resistors 32 and 34 is chosen so as to be able to compare the voltage at the node 26 with the low-voltage reference $V_R$ normally generated by a bandgap circuit.

The comparator 36 is a hysteretic comparator, of a type in itself known. As illustrated schematically in FIG. 8, the comparator 36 is provided with two different triggering thresholds: a lower threshold (positioned at a value $V_L'$ proportional to $V_L$) for falling-edge values of the signal $V_P$ applied at input to the comparator 36, and an upper threshold (positioned at a value $V_H'$ proportional to $V_H$) for rising-edge values of the signal $V_P$ applied at input to the comparator 36. For example, $V_L' = 3$ V and $V_H' = 20$ V.

Figure 8:
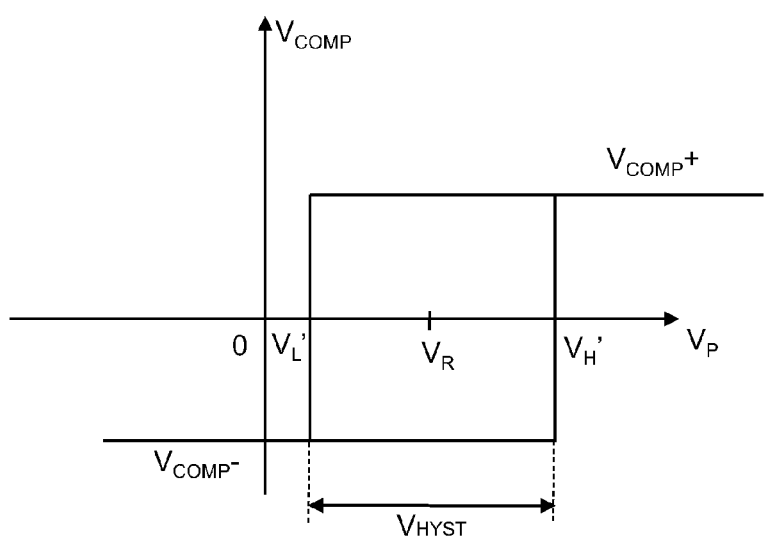
FIG. 8 shows a hysteresis curve of a hysteretic comparator of the control logic of FIG. 7.

The output $V_{COMP}$ of the comparator 36 assumes two values, indicated in FIG. 8 as $V_{COMP}^+$ and $V_{COMP}^-$. FIG. 8 exemplifies a comparator 36 with hysteresis around the value of the reference $V_R$.

In use, during charging of the second storage element 16, the output of the comparator 36 is at the value $V_{COMP}^-$; the switch 14 is driven into a closed state by the control circuit 38 and by the driving circuit 40; and the voltage $V_{IN\_CONV}$ across the second storage element 16 increases until it reaches the value $V_H$. When the voltage $V_{IN\_CONV}$ reaches a value equal to $V_H$ (i.e., the voltage $V_P$ reaches a value equal to $V_H'$), the output $V_{COMP}$ of the comparator 36 switches from $V_{COMP}^-$ to $V_{COMP}^+$. The control logic 38, via the driving circuit 40, opens the switch 14, and the DC-DC converter 6 is supplied at input exclusively by the second storage element 16. Then, the voltage $V_{IN\_CONV}$ (i.e., the signal $V_P$) decreases until it reaches the lower limit value $V_L$ (i.e., $V_L'$); at this point, the output $V_{COMP}$ of the comparator 36 switches to the value $V_{COMP}^-$ and the control logic 38, via the driving circuit 40, closes the switch 14, and the second storage element 16 is again charged by means of the charge stored in the first storage element 12.

What has been described above is also illustrated in FIGS. 9 and 10, which show the time plots of the signals $V_{TRANSD}$ (FIG. 9), and $V_{OUT\_INT}$ and $V_{IN\_CONV}$ (FIG. 10). It should here be noted that the signal $V_{TRANSD}$, supplied at output by the transducer 2, has an ideal time plot of an impulsive type, with pulses having all the same amplitude and the same frequency (they are uniform in time with respect to one another). The signal $V_{OUT\_INT}$ is defined on the basis of the ideal signal $V_{TRANSD}$. Each pulse of the signal $V_{TRANSD}$ of the transducer 2 generates an increase in the signal $V_{OUT\_INT}$, which assumes a steplike local profile. A real signal source $V_{TRANSD}$ is typically of a discontinuous type, with pulses having amplitudes different from one another and random onset frequency. A source of this type will cause a corresponding variation of the profile of increase of the signal $V_{OUT\_INT}$.

In an initial step of start-up of the energy harvesting system 10 (not illustrated in FIG. 10), the voltage present across the first storage element 12 is lower than the value $V_L$. The switch 14 is closed and the transducer 2 supplies energy to the first and second storage elements 12, 16, charging them (time interval preceding time $T_1$). Then, when the voltage across the first and second storage elements 12, 16 reaches the limit value of $V_H$ (time $t_1$), the switch 14 is opened. The voltage $V_{IN\_CONV}$ across the second storage element 16 starts to decrease, whilst the voltage $V_{OUT\_INT}$ across the first storage element 12 continues to rise (i.e., the process for charging the first storage element 12 continues).

Of course, what has been illustrated in FIGS. 9 and 10 indicates an optimal operating condition, in which the environmental energy converted by the transducer 2 is sufficiently high and such as to be higher than the energy used for charging the second storage element 16 and used by the electrical load $18a, \ldots, 18n$.

When the voltage $V_{IN\_CONV}$ reaches the lower-limit value $V_{IN\_CONV}=V_L$ (time $t_2$), the switch 14 is closed and there is a transfer of charge from the first storage element 12 to the second storage element 16. The voltage $V_{IN\_CONV}$ increases until the value $V_{IN\_CONV}=V_H$ is reached (time $t_3$).

The switch 14 is then opened again, and the step of discharge of the second storage element 16 is resumed.

As is known, the operation of charge sharing between the first storage element 12 and the second storage element 16 following upon closing of the switch 14 is the cause of a power loss due to the presence of the switch 14 itself. This causes a consequent reduction in the global efficiency of the energy harvesting system 10. The power $P_{CHARGE}$ useful for charging the second storage element 16 is given by the following Eq. (6):

$$P_{CHARGE} = P_{SCAV} - P_{CONV} - P_{SH} \qquad (6)$$

where $P_{SH}$ is the mean power lost during the operation of charge sharing.

The mean power $P_{SH}$ is defined as the ratio between the energy lost $\Delta E$ and the time interval $T_{SH}$ elapsing between a given charge-sharing event and a subsequent charge-sharing event (for example, with reference to FIG. 10, the interval $t_2$-$t_4$).

The energy $\Delta E$ and the interval $T_{SH}$ are defined by Eqs. (7) and (8):

$$T_{SH} = \frac{0.5 \cdot C_2 \cdot (V_H^2 - V_L^2)}{\eta_{DCDC} \cdot P_{LOAD}} \qquad (7)$$

$$\Delta E = 0.5 \cdot C_2 \cdot (V_H - V_L) \cdot \left[ 2 \cdot V_{OUT} + (V_H - V_L) \cdot \left( \frac{C_1 - C_2}{C_1} \right) \right] \qquad (8)$$

Consequently, $P_{SH}$ is given by Eq. (9):

$$P_{SH} = \frac{\Delta E}{T_{SH}} = \left[ \frac{2 \cdot V_{OUT} - \frac{C_2}{C_1} \cdot (V_H - V_L)}{(V_H - V_L)} - 1 \right] \cdot \eta_{DCDC} \cdot P_{LOAD} \qquad (9)$$

If the charge balancing is positive, the voltage $V_{OUT\_INT}$ across the first storage element 12 increases during the cycles $T_{SH}$; otherwise, it decreases. In order to maximize the value of energy stored in the first storage element 12 (and hence maximize the interval $T_{SH}$), it is advisable to maximize the threshold value $V_H$, which in any case must be kept within the input dynamics of the DC-DC converter 6. It is hence advisable to use DC-DC converters 6 with high input dynamics (in particular, with an upper limit of input dynamics of a value that is as high as possible) so as to enable high threshold values $V_H$.

When the interval $T_{SH}$ is maximized, the power dissipated on account of operations of charge sharing is reduced in so far as also the frequency of occurrence of the latter is reduced.

Figure 11:
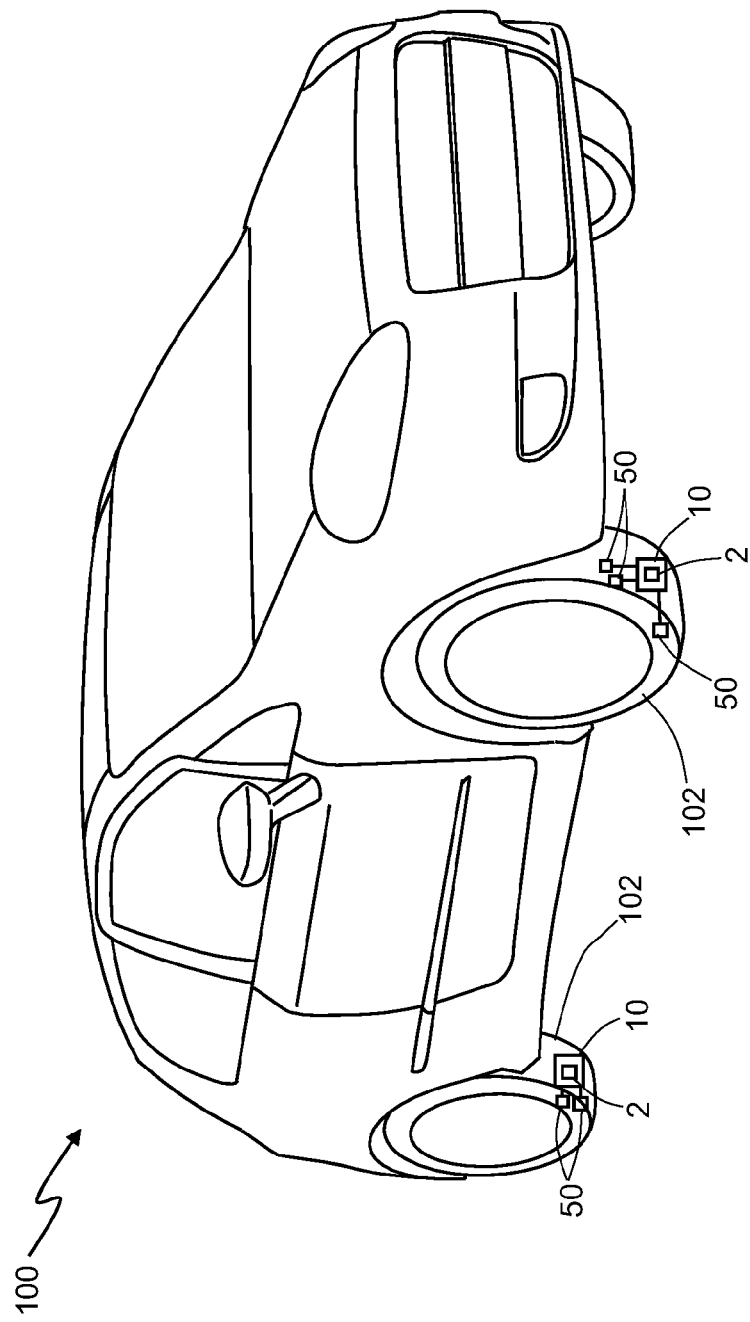
FIG. 11 shows a vehicle comprising the system of FIG. 3.

FIG. 11 shows a vehicle 100 comprising the energy harvesting system 10, according to one embodiment of the present invention. The vehicle 100 is, in particular, a motor vehicle. It is evident, however, that the energy harvesting system 10 can be used in any vehicle 100 or in systems or apparatuses other than a vehicle. In particular, the energy harvesting system 10 can find application in generic systems in which it is desirable to harvest, store, and use environmental energy, in particular by means of conversion of mechanical energy into electrical energy.

With reference to FIG. 11, the vehicle 100 comprises one or more transducers 2 coupled in a known way to a portion of the vehicle 100 that is subject to mechanical stresses and/or vibrations, for converting said mechanical stresses and/or vibrations into electric current.

The energy harvesting system 10 is connected to one or more electrical loads $18a \ldots 18n$. In particular, according to one application of the present invention, the electrical loads $18a \ldots 18n$ comprise TPM (tire-parameter monitoring) sensors 50 for monitoring parameters of tires 102. In this case, the TPM sensors 50 are coupled to an internal portion of the tires 102 of the vehicle 100. Likewise, also the transducers 2 (for example, of an electromagnetic or piezoelectric type) are coupled to an internal portion of the tire 102. The stress on of the transducers 2 when the vehicle 100 is travelling causes the production of a current/voltage electrical signal at output from the transducer 2 by means of conversion of the mechanical energy into electrical energy. The electrical energy thus produced is stored, as described previously, in the first storage element 12, and supplied, when necessary, to the second storage element 16, which in turn makes it available for the DC-DC converter 6 to which two or more TPM sensors 50 are connected. Thanks to the fact that the first storage element 12 has a capacitance greater than that of the second storage element 16, which is not constrained by parameters of design of the DC-DC converter 6, when the vehicle 100 stops it is in any case possible to supply the TPM sensors 50 using the electrical energy stored in the first storage element 12. By appropriately sizing the first storage element 12 it is possible to increase or reduce as desired the range of autonomy of supply of the TPM sensors 50 when the vehicle is stationary.

According to one embodiment of the present invention, the energy harvesting system 10, comprising one or more transducers, and the TPM sensors, are glued inside one or more tires 102.

The impact of the tire 102 on the ground during motion of the vehicle 100 enables production of electrical energy.

As an alternative to what is illustrated in FIG. 11, the energy harvesting system 10 can be set in any other portion of the vehicle 100, and/or used for supplying an electrical load other than or additional to the TPM sensors 50.

Another possible application of the energy harvesting system 10 is the generation of electrical energy by exploiting the mechanical energy produced by an individual when he is walking or running. In this case, the energy harvesting system 10 is located inside the shoes of said individual (for example, inside the sole). In systems aimed at fitness, where it is particularly interesting to count the steps, it is useful to recover energy from the vibrations induced by walking/running to be able to supply without the use of a battery acceleration sensors and/or RFID transmitters capable of communicating with cellphones, devices for playing music, or with any other apparatus involved in information on the steps performed.

From an examination of the characteristics of the invention obtained according to the present disclosure the advantages that it affords are evident.

In particular, the system according to the present invention has a high efficiency and autonomy irrespective of external conditions, such as possible energy peaks acquired by the transducer or a temporary absence of energy. In fact, the first storage element 12, which has a high capacity for storing energy, has the function of reserving energy in situations of temporary absence of energy; the switch 14 is configured for uncoupling, when necessary, the first storage element 12 from the DC-DC converter 6 and from the load of the latter, rendering operativeness of the energy harvesting system 10 independent of any particular temporary conditions external to the system itself.

Furthermore, the architecture proposed for the energy harvesting system 10 enables use of standard electronic components, i.e., ones not developed purposely for this application (for example, the DC-DC converter 6 does not need to be designed to satisfy particular conditions of input dynamics), which means a considerable economic saving and saving in terms of overall efficiency.

Finally, the hysteretic control of the switch 14 enables storage of a high electrical charge in the capacitor 16 without jeopardizing the functionality of the DC-DC converter 6 and without requiring any modification thereof.

Finally, it is clear that modifications and variations may be made to what has been described and illustrated herein, without thereby departing from the sphere of protection of the present invention, as defined in the annexed claims.

For example, there may be present a plurality of transducers 2, all of the same type or of a type different from one another, indifferently. For example, the transducer/transducers can be chosen in the group comprising: electrochemical transducers (designed to convert chemical energy into an electrical signal), electromechanical transducers (designed to convert mechanical energy into an electrical signal), electroacoustic transducers (designed to convert variations of pressure into an electrical signal), electromagnetic transducers (designed to convert a magnetic field into an electrical signal), photoelectric transducers (designed to convert light energy into an electrical signal), electrostatic transducers, or thermoelectrical transducers.

What is claimed is:

1. A system, comprising:
   an energy-harvesting system for use in harvesting energy from movement of a support;
   a transducer configured to convert energy coming from the energy-harvesting system into an electrical signal;
   a first capacitive storage element coupled to an output of the transducer and configured to receive said electrical signal and store electrical energy,
   a second capacitive storage element configured to store electrical energy; and
   a switch coupled between the first and the second capacitive storage elements and operable to directly connect the first and second capacitive storage elements to one another to transfer electrical energy from the first capacitive storage element to the second capacitive storage element and, alternatively, uncouple the first and second capacitive storage elements from one another;
   a DC-DC converter coupled between the second capacitive element and an electrical load, said DC-DC converter configured to receive electrical energy from the first capacitive storage element when the switch is closed and receive electrical energy from the second capacitive storage element when the switch is opened to produce a regulated output voltage; and
   control logic having an output coupled to control said switch, said control logic configured to close the switch when the electrical energy stored in the second capacitive storage element is lower than a first threshold value, and further configured to open the switch when the electrical energy stored in the second capacitive storage element is higher than a second threshold value.

2. The system according to claim 1, wherein the first capacitive storage element comprises a first conduction terminal and a second conduction terminal, wherein the second capacitive storage element comprises a first conduction terminal and a second conduction terminal, wherein the second conduction terminals of the first and second capacitive storage elements are connected to a common reference terminal, wherein the first conduction terminals of the first and second capacitive storage elements are directly connected to respective terminals of the switch in such a way that, when the switch is operated to electrically couple the first and second capacitive storage elements, the respective first conduction terminals of the first and second capacitive storage elements are directly connected to one another.

3. The system according to claim 1, wherein said first capacitive storage element has an electrical energy storage capacity greater than that of said second capacitive storage element.

4. The system according to claim 1, wherein the control logic comprises:
   a comparator with hysteresis configured to receive on a first input a first comparison signal indicative of electrical energy stored in the second capacitive storage element, and receive on a second input a second predefined comparison signal, and supply at the output a third comparison signal indicative of a result of a comparison between the first and second comparison signals;
   a control and driving circuit configured to receive the third comparison signal and, on the basis of the third comparison signal, control opening or closing of the switch.

5. The system according to claim 1, wherein the electrical signal generated by the transducer is an AC voltage signal, the system further comprising a scavenging interface having an input connected to the transducer and an output connected to the first capacitive storage element, the scavenging interface configured to receive at an input the electrical signal and generate at an output a first intermediate DC signal to charge the first capacitive storage element.

6. The system according to claim 5, the DC-DC converter further configured to accept a voltage signal having a value lower than a maximum value, and the second capacitive storage element being configured in such a way that the difference of potential that, in use, is set up across its terminals has a value lower than said maximum value.

7. The system according to claim 1, wherein said support is a means of transport.

8. The system according to claim 1, wherein said transducer is chosen from the group consisting of: electrochemical transducer, electromechanical transducer, electroacoustic transducer, electromagnetic transducer, photoelectric transducer, electrostatic transducer, thermoelectrical transducer.

* * * * *